United States Patent [19]
Hawkins

[11] Patent Number: 5,348,331
[45] Date of Patent: Sep. 20, 1994

[54] TRAILER STABILIZER AND METHOD

[75] Inventor: Wallace H. Hawkins, Greenville, S.C.

[73] Assignee: Delta Estates, Inc., Greenville, S.C.

[21] Appl. No.: 839,622

[22] Filed: Feb. 21, 1992

[51] Int. Cl.[5] ............................................. B60D 1/22
[52] U.S. Cl. ................................ 280/476.1; 280/455.1
[58] Field of Search .................. 280/476.1, 455.1, 432, 280/460.1; 188/313, 281

[56] References Cited

U.S. PATENT DOCUMENTS

| | | | |
|---|---|---|---|
| 2,726,097 | 12/1955 | Darrough | 280/432 |
| 3,663,039 | 5/1972 | Morgan | 280/455.1 |
| 3,815,939 | 6/1974 | Pettay | 280/476.1 |
| 3,955,655 | 5/1976 | Pornin | 188/313 |
| 4,262,920 | 4/1981 | Mett et al. | 280/455.1 |
| 4,645,226 | 2/1987 | Gustavsson et al. | 280/476.1 |
| 4,700,966 | 10/1987 | Hawkins et al. | 280/455.1 |
| 4,902,030 | 2/1990 | Andre | 280/455.1 |

FOREIGN PATENT DOCUMENTS

2059371  4/1981  United Kingdom ............. 280/455.1

*Primary Examiner*—Michael S. Huppert
*Attorney, Agent, or Firm*—Ralph Bailey

[57] ABSTRACT

A stabilizer for a multi-trailer rig has a cylinder assembly including a cylinder A and a piston rod E pivotally mounted between a front trailer on one end and a wheeled dolly at H exerting a force which at all times is in a direction tending to bring the dolly into alignment and thereby bring a rear trailer which follows the dolly into alignment. A pair of such cylinder assemblies may be provided with each having a central stop member B carried internally of a cylinder with pistons C and D on each respective side for effectively moving to pull or to push until such action may be reversed following engagement of a piston with the central stop member. Exerting control over alignment of the dolly stabilizes the trailers and continues to exert a force to maintain alignment, yet permits turning. A locking clutch member I may be manually fixed to limit movement of the cylinder and piston rod thereby preventing the dolly from coming out of alignment during backing. An anti-jackknifing apparatus includes a stop J pivoted downwardly from the trailer into the slot of the tractor fifth wheel.

25 Claims, 5 Drawing Sheets

TRAILER STABILIZER AND METHOD

BACKGROUND OF THE INVENTION

This invention relates to a stabilizer apparatus especially useful for a multi-trailer rig to avoid swaying, fishtailing and the like while aiding in maintaining alignment for proper tracking on the highway.

In addition to jackknifing, as often occurs between tractors and trailers, multi-trailer rigs, often fishtail or otherwise sway as a result of failure to track in a straight path. These tendencies to sway are exacerbated by wind as well as other conditions on the highway. Driving a multi-trailer rig is a strenuous task since intense concentration is required by the driver at all times to counteract the tendency to sway which can result in loss of control of the vehicle. In common practice, the connection between respective trailers is through a simple pivotal connection at each end of a wheeled dolly which acts as a pivoted link connecting the trailers. Heretofore, there were no forces other than alignment of the respective trailers and connecting parts for avoiding swaying and maintaining straight tracking.

A stabilizing device for a trailer having a base fixed to the trailer carrying a pivoted plate is illustrated in U.S. Pat. No. 4,706,984. A pair of transversely spaced cylinder assemblies are each connected on one end to the plate and on the other end to the trailer. A solenoid valve to the cylinder assemblies is closed when the speed increases beyond a predetermined level increasing resistance offered by the cylinder assemblies to turning of the trailer.

Heretofore, many efforts have been made to avoid jackknifing. Some of these efforts include the use of abutments carried by the trailer and positioned in the slot of the fifth wheel of the tractor as disclosed in U.S. Pat. Nos. 4,934,727, 4,790,556, 4,784,403 and 4,700,966 and U.S. patent applications Ser. Nos. 07/597,001 and 07/770,571 now both abandoned which are also in the name of the present inventor, Wallace H. Hawkins.

The apparatus and method of this application complement the stabilizing effects of anti-jackknifing apparatus by also controlling movement between multiple trailers and thus combining to exert a stabilizing effect on the entire rig.

It is also an important object of this invention to minimize swaying or fishtailing between multiple trailers in tractor trailer rigs maintaining straight tracking by exerting of forces between a front trailer and a wheeled dolly to maintain alignment between the trailers, even as during an emergency stop. Because of the double pivot of the short dolly, such would otherwise have a tendency to fold up when the force of the back trailer is pushed forward resulting in a major cause of misalignment.

Another important object of the invention is to avoid fishtailing and to stabilize multi-trailer tractor trailer rigs by exerting forces as a force couple on opposite sides between a front trailer and the dolly as by fluid motors and the like tending to bring back alignment and by means of pressure continue to exert a force to hold the dolly in alignment.

Another important object of the invention is to temporarily establish a rigid connection between a trailer and a dolly of a multi-trailer rig during backing by actuation of mechanical stops limiting the action of the fluid operated cylinders pivotally connected between the trailer and dolly.

While the stabilizer is described in terms of its special usefulness in a pair of cylinder assemblies controlling a dolly of a multi-trailer rig, other uses are contemplated. Description is further in terms of a two trailer rig, but such stabilizers are also useful as on a three trailer rig. Since the cylinder assemblies each work independently at all times to exert a force tending toward alignment a breaking down of one cylinder assembly would not prevent the other to continue to work effectively to maintain alignment. While it may be possible to maintain alignment using only one stabilizer, the use of two are preferable because of the desirability of exerting a force couple to control the dolly. Since the dolly is short, it is relatively easily controlled as compared to a trailer. Since the back trailer follows the dolly, it is not necessary to exert a direct force upon the trailer.

SUMMARY OF THE INVENTION

It has been found that fishtailing and swaying may be minimized between the trailers of a multi-trailer tractor trailer rig by utilizing transversely spaced air operated cylinder assemblies exerting forces in opposite directions on each side between a trailer and dolly so that when the trailers are out of alignment, each cylinder assembly attempts at all time to maintain the trailers in alignment for proper tracking. A centering mechanism positions pistons of the air operated cylinders in a neutral or centered position at all times when alignment is proper. Preferably the fluid operated cylinder assemblies are utilized in addition to an anti-jackknifing device of the type having an abutment or stop member carried by the trailer pivoted downwardly into the slot of the fifth wheel.

As an aid in backing, a mechanical clutch connection is provided for engagement locking the cylinder assemblies establishing a straight connection between a front trailer and the dolly.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2-A is a transverse sectional elevation taken on the line 2-A—2-A in FIG. 2 illustrating the operation of the pivotal abutment of the anti-jackknifing device;

DESCRIPTION OF A PREFERRED EMBODIMENT

The drawings illustrate an air operated cylinder assembly for exerting a stabilizing force upon a wheeled dolly 10 between a front trailer 11 and a back or rear trailer 12 of a multi-trailer rig. An elongated cylinder A has a source 13 of pressurized air from the trailer air supply line 14 on one end. A stop member B is fixed internally of the cylinder intermediate its ends and has an open central portion. A first piston C is slidably carried on one side of the stop member. A second piston D is freely moveable within the cylinder on the other side of the stop. An elongated piston rod E, slidably carrying said first piston, is extensible through the open central portion of the stop member for pushing the second piston and projecting outwardly through one end of the cylinder. A fluid connection F is provided between respective end portions of the cylinder. An engaging member G is carried by the piston rod limiting further sliding movement of the first piston thereon. A pivotal connection is provided between the cylinder assembly and a rear of the front trailer on one end and a pivotal connection is provided at H on the other end to the dolly 10. Thus, the cylinder assembly resists compressive forces by pushing as a result of a build up of pressure at the other end of the cylinder due to pushing of the second piston by the piston rod until the second piston moves responsive to such build up of pressure to engage said stop member after which further movement of the piston rod causes movement of the first piston to result in pulling controlling alignment of the dolly.

A releasable lock I fixes the cylinder assemblies positioning the dolly 10 against movement during backing. An anti-jackknifing device, including a pivotal abutment J, is illustrated in the tractor fifth wheel slot.

One of the assemblies exerts a pulling force tending to urge a respective side of the dolly into alignment, while the other of said assemblies exerts a pushing force also tending to urge the other side of the dolly into alignment during periods of misalignment between trailers. Thus, tracking is improved through such alignment and any tendency to fishtail is reduced.

The center stop B includes a collar positioned in a central portion of the cylinder as by bolts 15. With the pistons C and D both closely adjacent the stop B as in FIG. 3, the front and rear trailers are in straight forward alignment. Any movement of the trailer 12 out of alignment will result in the cylinder assemblies applying forces respectively, pushing and pulling the trailer back into alignment.

An important feature of the invention is the center stop which may be in the form of a collar B, because it stops the respective pistons C and D when the trailers are brought into alignment.

The stop members B are secured as by bolts 15 in a central portion of the cylinder between the pistons C and D. The line F has a check valve 16 which permits air to be pumped through the line F into the rear chamber portion of the cylinder behind the piston D. As sufficient pressure is developed in this portion of the cylinder, a pop-off valve 17 release is actuated to relieve the pressure. A rear cylinder head 18 has a connecting member 19 to a socket 20 for receiving the pivot pin 50 carried by the dolly 10 in the area of the fifth wheel 21. The piston rod E has a socket 22 having connection to a pivot pin 23 carried by the rear of the front trailer. The line F is also provided with a check valve designated at 24 which permits the flow in of air from the supply line 14 and through the line 13 into the cylinder A forward of the piston C but which prevents the return through the line 13 when pressure builds up in the cylinder forwardly of the piston C, thus causing air to be pumped through the line F.

Figure 1:
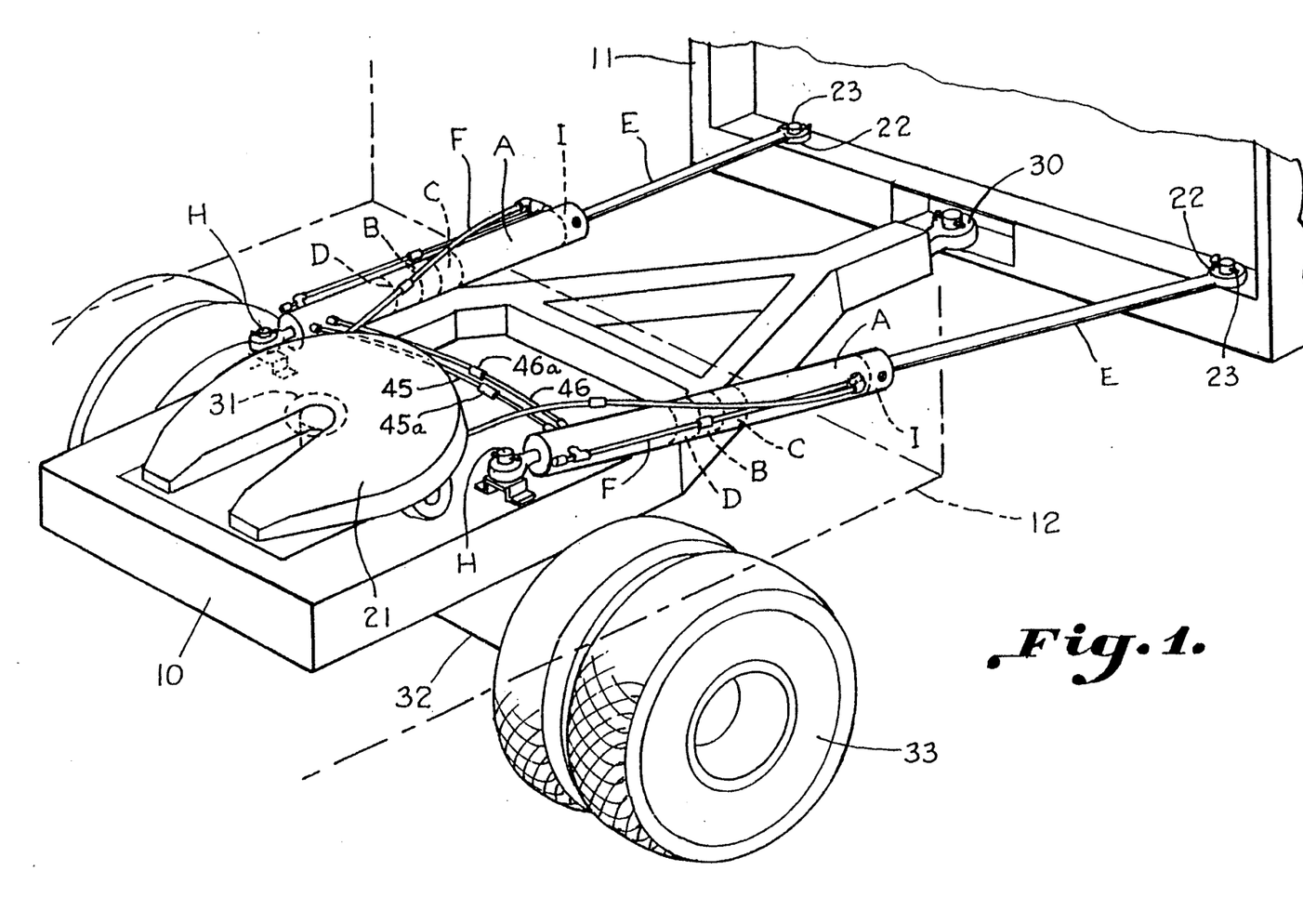
FIG. 1 is a perspective view illustrating a stabilizer, including a pair of transversely spaced cylinder assemblies, having pivotal connection to a front trailer as well as a pivotal connection to a wheeled dolly which carries a rear trailer for pivotable movement on a king pin.
Figures 3, 4, 5:
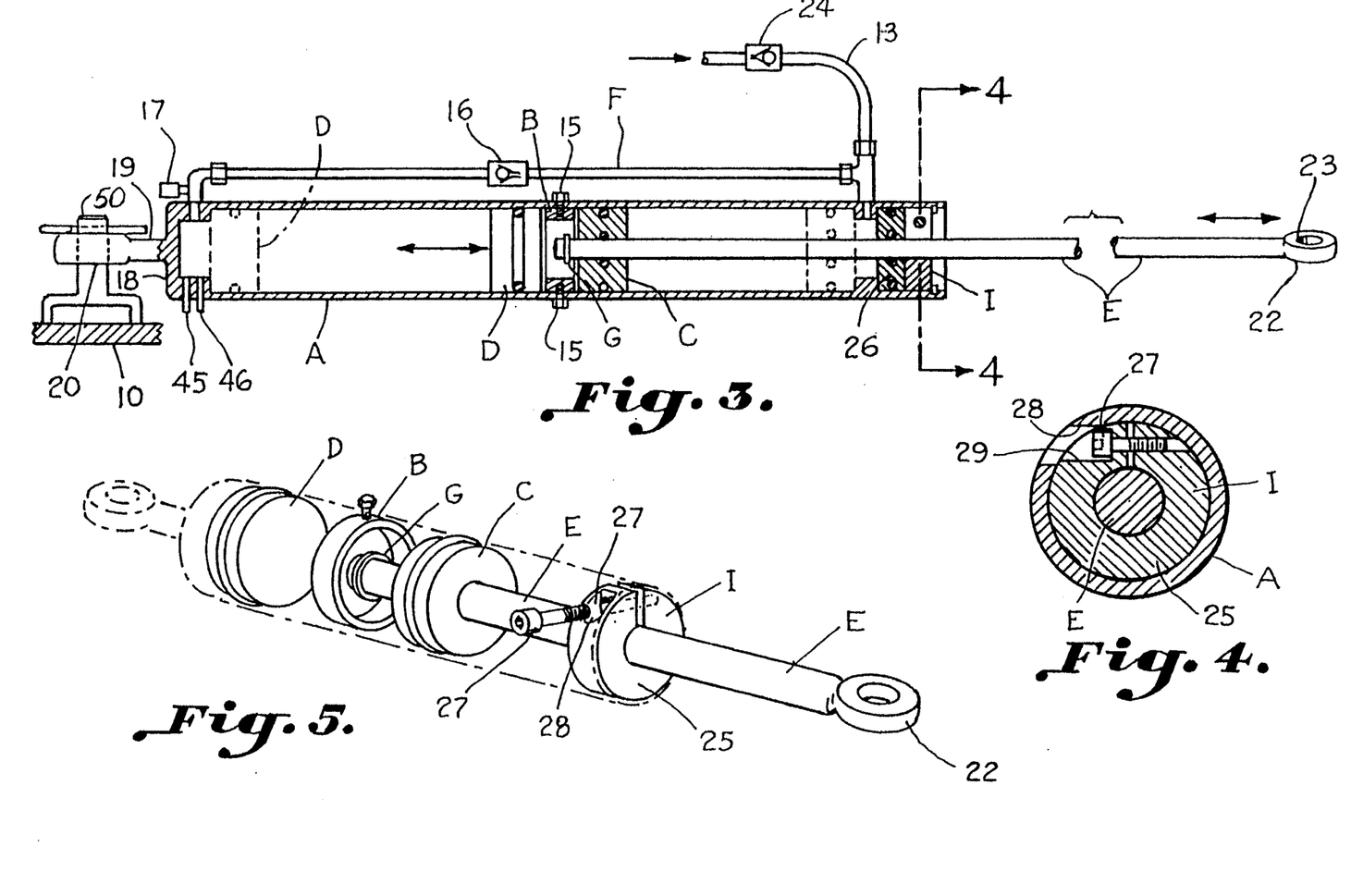
FIG. 3 is a longitudinal sectional elevation illustrating a stabilizer cylinder assembly constructed in accordance with the present invention.
FIG. 4 is a transverse sectional elevation taken on the line 4—4 in FIG. 3 illustrating a clutch lock constructed in accordance with the present invention for maintaining alignment of the dolly during backing.
FIG. 5 is a perspective view illustrating a piston rod and piston assembly constructed in accordance with the present invention.
Figure 6:
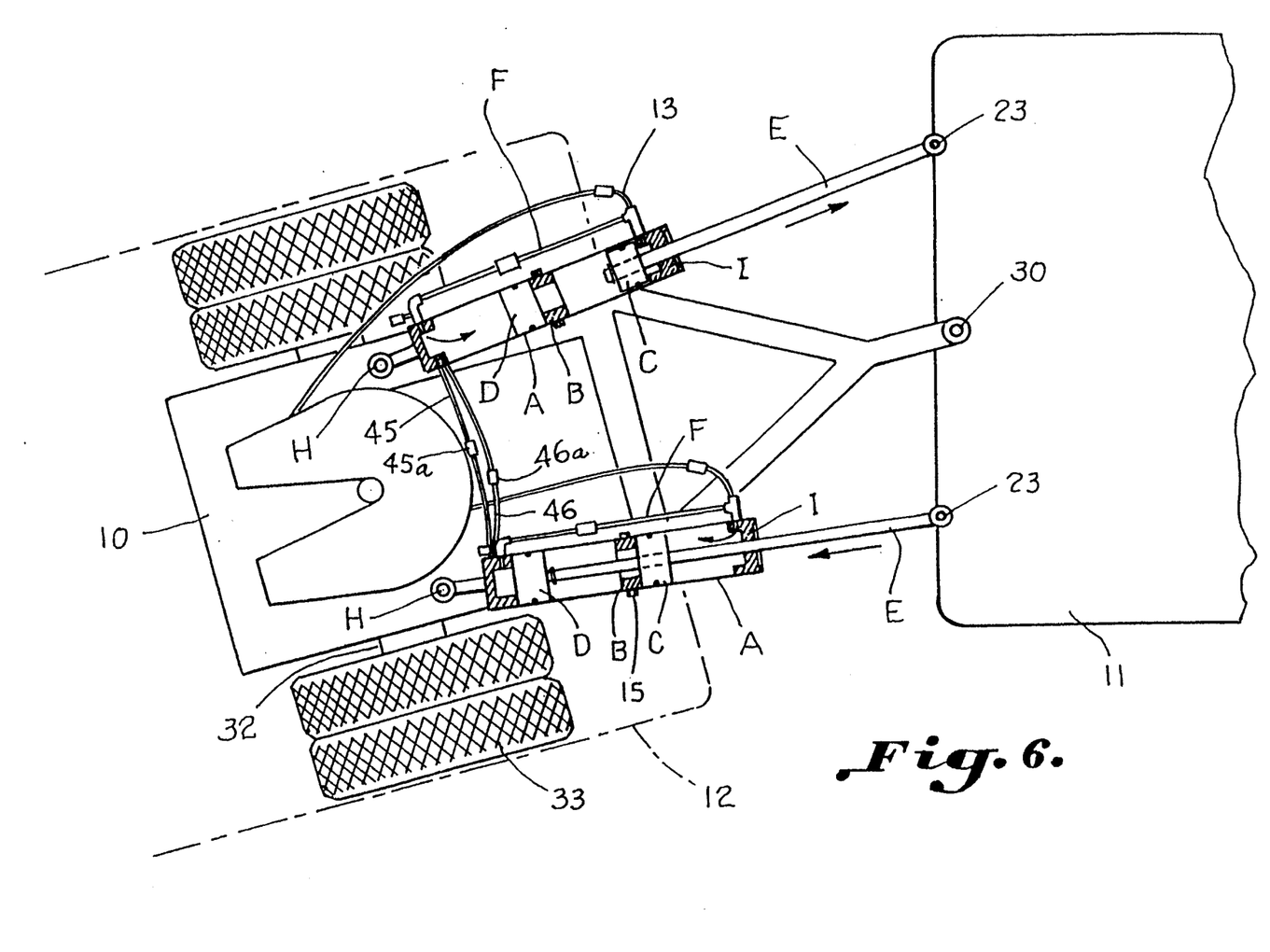
FIG. 6 is a plan view further illustrating the trailer stabilizer between a front trailer, dolly and rear trailer during a turn.
Figure 7:
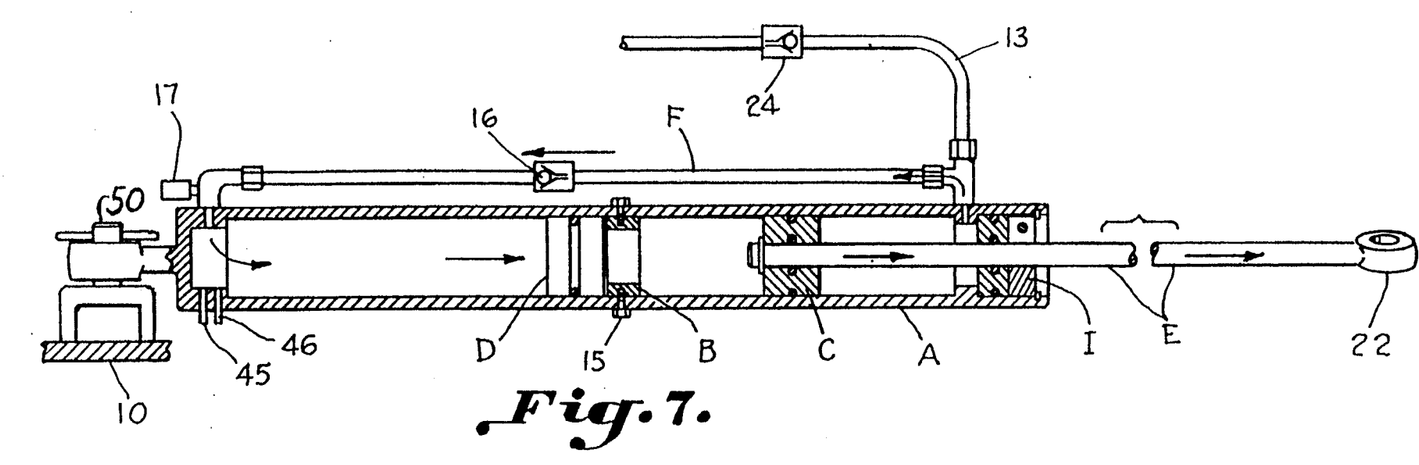
FIG. 7 is a transverse sectional elevation further illustrating the stabilizer.
Figure 8:
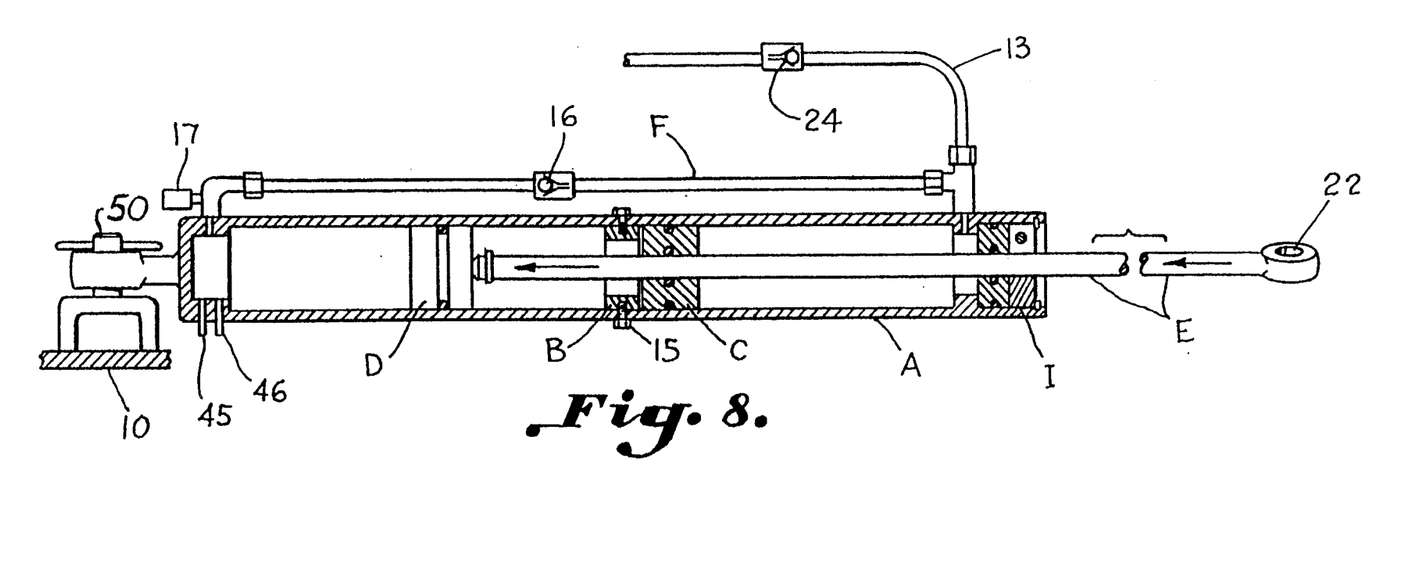
FIG. 8 is a transverse sectional elevation similar to FIG. 7 further illustrating the stabilizer.

FIGS. 3, 4 and 5 illustrate the clutch locking member I which includes split sleeve 25 carried by the piston rod E within the forward portion of the cylinder immediately forward of the cylinder head 26. The sleeve may be tightened so as to be fixed upon the piston rod by tightening the bolt 27 to which access is provided by the openings 28 and 29 in the cylinder A and sleeve 25 respectively (FIG. 4). It will be noted that the dolly 10 has pivotal connection as at 30 to a back portion of the forward trailer 11. The king pin 31 of the rear trailer 12 is illustrated in FIG. 1 as being positioned for towing of the trailer in the fifth wheel 21 of the dolly 10. The pivotal connection H is made in the area adjacent the fifth wheel 21 and the axle 32 of the dolly wheels 33.

Figure 2:
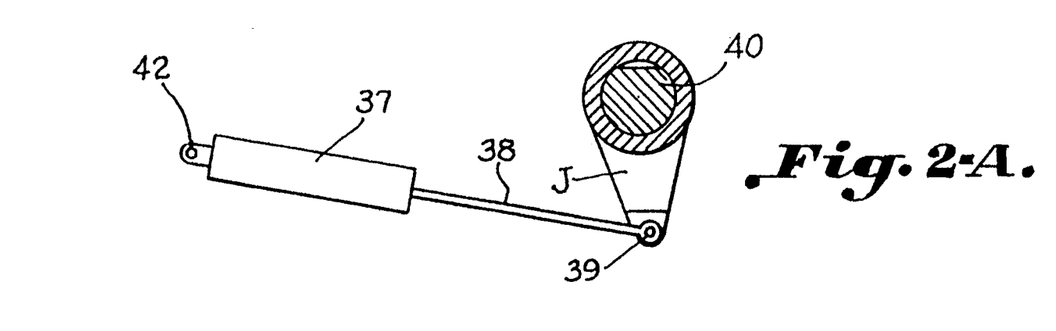
FIG. 2 is a top plan view illustrating a multi-trailer rig wherein an anti-jackknifing device is carried by the front trailer for operation with the fifth wheel of a tractor and a stabilizer assembly is illustrated with pivotal connection between the rear of the front trailer and the wheeled dolly adjacent the fifth wheel of the dolly.

Referring more particularly to FIG. 2, it will be noted that a suitable anti-jackknifing device is illustrated having an abutment member J which may be pivoted downwardly into the slot of the fifth wheel 35 of the tractor 36 as disclosed in the foregoing patents in the name of the present inventor. FIG. 2A illustrates the use of a cylinder 37 operated by air from the supply line 14a. The cylinder extends and retracts the piston rod 38 in order to pivot the abutment member J from its upper portion adjacent the trailer 11 downwardly as illustrated in FIGS. 2 and 2-A into the slot in the fifth wheel 35. The piston rod has pivotal connection as at 39 with an end of the abutment member J remote from a transverse shaft 40 carried by the trailer 11. When the stop member J is within the slot of the fifth wheel 35, the angle by which the trailer 11 may become out of alignment with the tractor 36 is limited, preventing jackknifing. Combined with the action of the cylinder assemblies, the anti-jackknifing device stabilizes the rig and thereby further prevents jackknifing of the entire rig. The shaft 40 is carried by the frame 41 which is carried beneath and fixed to the trailer 11. The cylinder 37 has pivotal connection as at 42 with the frame 41.

OPERATION

In operation each cylinder assembly is always either pushing or pulling in the opposite direction to the way the back trailer is turning as to be out of proper alignment. One cylinder assembly pushes and the other cylinder assembly is pulling exerting a force couple to bring the trailers back in line. Once the cylinder assemblies are brought back to center position as in proper alignment of the trailer, if the trailer then starts in an opposite direction one cylinder will stop pushing and start pulling while the other cylinder stops pulling and starts pushing, and the further the trailer turns, the harder the cylinders will push and pull as pressure builds in each cylinder. Because the effective diameter of the front piston C is smaller than the diameter of the back piston D as a result of the reduction in diameter caused by the presence of the piston rod E, the piston C can act as a pump causing air to flow through the line F making it progressively harder to push the piston D to the left in FIG. 3.

As the piston C is pulled forward, air pressure in the cylinder increases and is pushed into the rear section of cylinder through the line F. Air is pushed through a check valve 16, allowing air to enter back chamber of the cylinder while preventing such air from returning. Thus, forward movement of the cylinder C acts as a pump for increasing pressure in the rear section of the cylinder effectively adding force for pushing and pulling and holding the trailer in alignment.

It is noted that in turning, the front trailer is effective through its weight and power to overcome the force exerted by the respective cylinders, and if the turn is sharp enough, sufficient pressure may build to actuate the pop-off valve 17. The back trailer 12 turns only the amount of the front trailer 11, because the back trailer follows the dolly 10.

The dolly by itself does not exert sufficient force to make the trailer move and is ineffective in overpowering the force of the cylinders. The back trailer has no power to control the dolly, because it is pivotally mounted on the king pin to turn on the greased fifth wheel. Heretofore, forward thrust of the rear trailer caused the dolly to get out of alignment causing jackknifing and out of control conditions. Such is greatly reduced since the dolly is held in alignment by the cylinders anchored to the front trailer. The dolly, therefore, does what the front trailer does as a result of the action of the spaced cylinder assemblies.

Thus, the cylinder assemblies exert a force at all times tending to bring the dolly into alignment and hence bring the rear trailer which follows the dolly into alignment. Each cylinder assembly is provided with a center stop B carried internally of the cylinder with pistons C and D on each side for effectively moving to pull or push until such action is stopped through engagement with the center stop. The releasable lock or clutch I fixes the cylinder assemblies for permitting backing. Preferably, an anti-jackknifing device has a pivotal restraining member engageable in the slot of the fifth wheel of the tractor to act in combination with the cylinder assemblies to stabilize the entire rig and prevent jackknifing.

If desired, lines 45 and 46 may be utilized between the back portions of each cylinder A as shown in FIGS. 1, 3, 7 and 8. Each of these lines has a check valve 45a and 46a permitting a flow in opposite directions. These lines permit air to flow from one cylinder A to another until sufficient air pressure is developed to actuate the respective pop-off valves 17 thus maintaining a sufficient air pressure in the back of the cylinders. The check valves are set for a desired pressure, perhaps in excess of that developed by the piston C depending upon the load to be carried by the trailer. If either of these lines were to rupture, resulting in loss of pressure, the other cylinder would continue to operate to exert forces in the proper direction to maintain alignment.

While a preferred embodiment of the invention has been described using specific terms, such description is for illustrative purposes only, and it is to be understood that changes and variations may be made without departing from the spirit or scope of the following claims.

What is claimed is:

1. A stabilizer for trailers attached to a tractor wherein a wheeled dolly has a pivotal connection on a first trailer and a pivotal connection by a king pin to a second trailer for highway use comprising:
    a pair of transversely spaced pneumatic cylinder assemblies each pivotally connected on one end to said first trailer and respectively having a first piston rod and a second piston rod;
    a pivotal connection between the other end of said cylinder assemblies and said wheeled dolly;
    one of said assemblies exerting a pulling force at all times during which a respective side of a back end of said first trailer is too far apart from a respective side of a front end of said second trailer urging a respective piston rod toward a predetermined position to urge a respective side of the dolly into alignment;
    said predetermined position being a neutral position of said respective first and second piston rods wherein said dolly is in alignment with said first trailer; and
    pneumatic means in said cylinder assemblies maintaining said first and second piston rods in said neutral position except when overcome by movement of said first trailer out of alignment;
    whereby tracking is improved through such alignment and any tendency to fishtail is reduced.

2. The structure set forth in claim 1 including a releasable lock fixing said cylinder assemblies positioning said dolly against misalignment as when backing.

3. The structure set forth in claim 2 wherein said locks maintain each of said cylinder assemblies in a neutral, centered fixed position for backing.

4. The structure set forth in claim 1 wherein said neutral position of said first and second piston rods is defined by a terminal portion of each of said piston rods being disposed proximate respective centers of said cylinder assemblies.

5. The structure set forth in claim 1 wherein said first trailer is pivotally connected to a fifth wheel including:
    an abutment carried by a lower front portion of said first trailer; and
    fluid power operated means moving said abutment into and out of engagement with said fifth wheel for limiting the angle between the first trailer and the tractor.

6. The structure set forth in claim 1 wherein said pneumatic cylinder assemblies are each pivotally connected on one end at a free end of respective first and second piston rods, and on the other end at a back end of respective first and second cylinders, whereby said pneumatic cylinder assemblies are each connected between the first trailer and the dolly.

7. The structure set forth in claim 6 wherein said pneumatic cylinder assemblies exert forces simultaneously in opposite directions forming a force couple during periods of misalignment of said trailers urging said trailers toward alignment through control over the dolly.

8. A method of stabilizing trailers of a multi-trailer rig having a dolly between trailers comprising the steps of:
    exerting a pulling force between a back of a first trailer and a wheeled connecting dolly urging said dolly in a direction to overcome misalignment;

simultaneously exerting a transversely spaced pushing force between said back of said first trailer and said dolly urging said dolly in said direction to overcome misalignment; and maintaining the application of said forces as a force couple during periods of misalignment of said trailers at all times urging said trailers toward alignment through control over the dolly.

9. The method set forth in claim 8 wherein said forces are applied by air operated cylinder assemblies, and comprising the further step of maintaining pressure in said cylinder assemblies avoiding misalignment.

10. The method set forth in claim 9 including operating said cylinder assemblies separately for always exerting a force tending toward alignment of the trailers.

11. The method set forth in claim 10 including reversing said cylinder assemblies from pulling to pushing and from pushing to pulling when either of a pair of pistons in each cylinder assembly engages a central stop member therebetween.

12. The method set forth in claim 11 including the step of providing a pair of lines each having a check valve and a relief valve adjustable to operate at a predetermined pressure between back ends of respective cylinders maintaining sufficient pressure for respective cylinder assemblies to exert a predetermined pushing force.

13. A method of stabilizing a dolly having an elongated frame with pivotal connection at a front end at a rear of a first trailer and having spaced wheels mounted in transverse alignment on said dolly for carrying a front end of a second trailer having a pivotal connection thereto by a king pin adjacent a rear of said dolly, comprising the steps of:

exerting a pulling force with one of two pistons of a first cylinder at all times during which a back end of said first trailer is too far apart from a front end of said second trailer; and reversing the direction of said force with one or two pistons of a second cylinder at all times during which sides of said back end and said front end are too close for proper alignment.

14. A method of backing a multi-trailer rig including a front trailer pivotally connected to a dolly having transversely spaced aligned wheels comprising the steps of:

providing an extensible air-operated cylinder assembly between said front trailer and said dolly on one side thereof applying a force at all times during misalignment of said trailers urging said trailers toward alignment through control over the dolly; and locking a piston rod of said extensible cylinder assembly limiting pivotal movement between said front trailer and said dolly during backing.

15. A fluid operated cylinder assembly for exerting a stabilizing force comprising:

an elongated cylinder having a source of pressurized fluid on one end;

a stop member fixed internally of the cylinder intermediate its ends having an open central portion;

a first piston slidably carried on one side of said stop member;

a second piston freely moveable within said cylinder on the other side of said stop;

an elongated piston rod, slidably carrying said first piston, extensible through the open central portion of the stop member for pushing said second piston and projecting outwardly through one end of the cylinder;

a fluid connection between respective end portions of said cylinder; and an engaging member carried by said piston rod limiting said sliding movement of the first piston thereon;

whereby said cylinder assembly resists compressive forces by pushing as a result of a build up of pressure at the other end of the cylinder due to pushing of the second piston by said piston rod until the second piston moves responsive to such build up of pressure to engage said stop member after which further movement of the piston rod causes movement of the first piston to result in pulling.

16. The structure set forth in claim 15 including a fluid connection between respective end portions of said cylinder, and a pressure relief valve in a back portion of said cylinder.

17. The structure set forth in claim 16 wherein said fluid is air, including a first check valve in a supply line from said source of pressurized fluid to said cylinder, and a second check valve in said fluid connection.

18. The structure set forth in claim 15 including a locking member carried by said piston rod limiting said sliding movement of the first piston.

19. An air operated cylinder assembly for exerting a stabilizing force upon a wheeled dolly between trailers of a multi-trailer rig comprising:

an elongated cylinder having a source of pressurized fluid on one end;

a stop member fixed internally of the cylinder intermediate its ends having an open central portion;

a first piston slidably carried on one side of said stop member;

a second piston freely moveable within said cylinder on the other side of said stop;

an elongated piston rod, slideably carrying said first piston, extensible through the open central portion of the stop member for pushing said second piston and projecting outwardly through one end of the cylinder;

a fluid connection between respective end portions of said cylinder;

an engaging member carried by said piston rod limiting further sliding movement of the first piston thereon;

pivotal connections between said cylinder assembly and a rear of a front trailer on one end and on the other end to said dolly;

whereby said cylinder assembly resists compressive forces by pushing as a result of a build up of pressure at the other end of the cylinder due to pushing of the second piston by said piston rod until the second piston moves responsive to such build up of pressure to engage said stop member after which further movement of the piston rod causes movement of the first piston to result in pulling controlling alignment of the dolly.

20. The structure set forth in claim 19 including a pair of such cylinder assemblies being spaced for connection on respective sides of said trailer and dolly, and a source of pressurized air for operating said cylinder assemblies individually.

21. A stabilizer for a multi-trailer rig having a front trailer and a pivotally connected wheeled dolly including an extensible cylinder assembly pivotally mounted between said front trailer and said wheeled dolly exerting a force at all times tending to bring the dolly into alignment and hence bring a rear trailer which follows the dolly into alignment;

a center stop carried in said cylinder assembly; and a front and rear piston on respective sides of said center stop for effectively moving to pull or to push until such action is stopped through operation thereof with the center stop.

22. The structure set-forth in claim 21 including a pair of said cylinder assemblies in transverse spaced alignment;

a pair of lines each having a check valve connecting back ends of a cylinder of each cylinder assembly; and a pressure relief valve adjustable to operate at a predetermined pressure limiting pressure in said back ends.

23. An articulated tractor trailer rig stabilized by a stabilizer having a front trailer and a pivotally connected wheeled dolly including an extensible cylinder assembly pivotally mounted between said front trailer and said wheeled dolly exerting a force at all times tending to bring the dolly into alignment and hence bring a rear trailer which follows the dolly into alignment, said stabilizer further including a center stop carried in said cylinder assembly and a front and a rear piston on respective sides of said center stop for effectively moving to pull or push until such action is stopped through engagement thereof with the center stop, comprising:

an abutment carried by a bottom front portion of said front trailer;

fluid power operated means moving said abutment into and out of engagement with a fifth wheel of said tractor for limiting the angle between the front trailer and the tractor; and extensive fluid power operated means pivotally connected at respective ends to a rear of said front trailer and to said dolly for controlling alignment of said dolly;

whereby jackknifing is avoided.

24. The structure set forth in claim 23 wherein said extensible fluid power operated means is connected on one side of said dolly and exerts a pulling or pushing force depending upon which is necessary to improve alignment of the dolly.

25. The structure set forth in claim 24 including a manually engageable lock limiting extensibility of said power operated means during backing.

* * * * *